April 14, 1959  E. J. GARLAND  2,882,388
FLASHLIGHT END CAP
Filed May 11, 1955  2 Sheets-Sheet 1
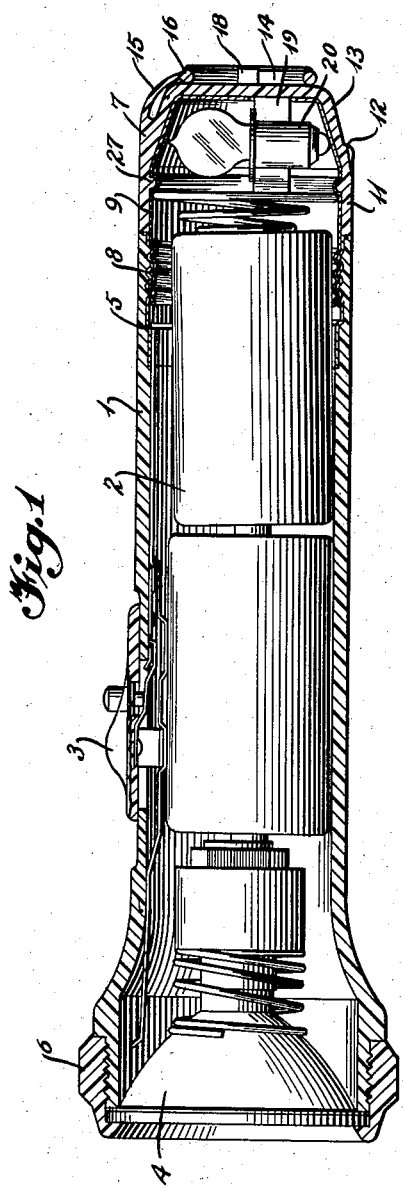
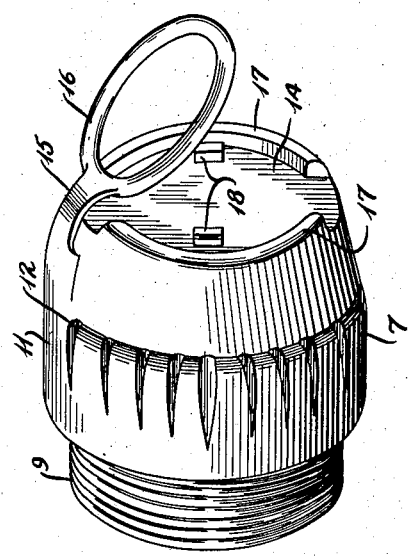
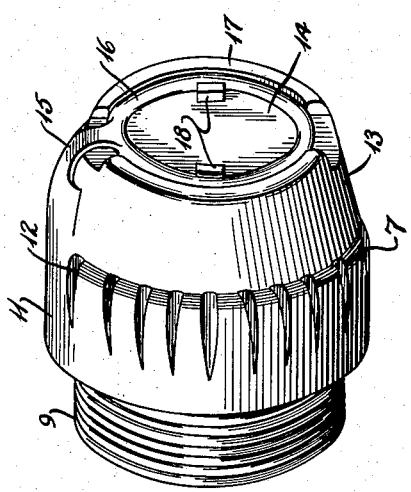
INVENTOR
Edward J. Garland
BY Beale & Jones
ATTORNEYS April 14, 1959     E. J. GARLAND     2,882,388
FLASHLIGHT END CAP
Filed May 11, 1955     2 Sheets-Sheet 2
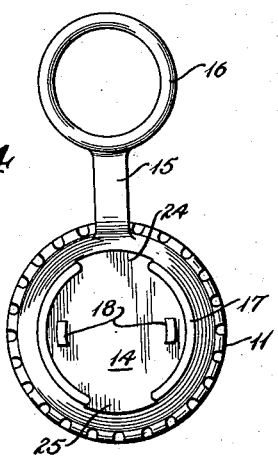
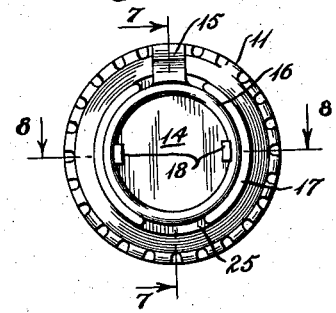
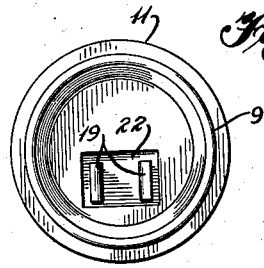
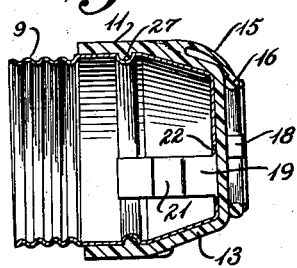
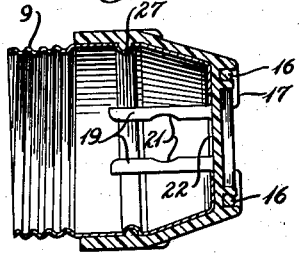
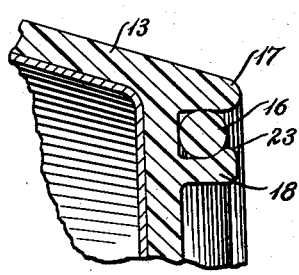
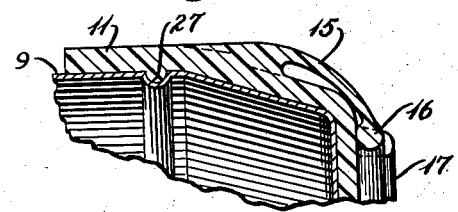
INVENTOR
Edward J. Garland
BY Beale & Jones
ATTORNEYS United States Patent Office 2,882,388
Patented Apr. 14, 1959

2,882,388

FLASHLIGHT END CAP

Edward J. Garland, Shrewsbury, Mass., assignor, by mesne assignments, to The Electric Storage Battery Company, Philadelphia, Pa., a corporation of New Jersey Application May 11, 1955, Serial No. 507,528

2 Claims. (Cl. 240—10.6)

This invention relates to an end cap and carrying device for flashlights.

Many types of suspending and carrying devices are now known and in use in the flashlight art. In general, the suspending and carrying devices comprise a metallic bail pivotally secured to the flashlight casing. The manufacture of an end cap having this type of bail requires a plurality of complex and separate manufacturing steps, all of which add to the expense of manufacture.

An object of the present invention is to provide a novel type of end cap and carrying means fabricated of plastic molding powder in a single molding operation, to provide an end cap, bail and hinge member connecting the bail to the end cap, all integrally united.

Another object of the invention is to provide an inexpensive method of manufacturing an end cap for a flashlight and carrying means integral therewith, in which the manufacturing operations are simplified by fabricating the end cap and carrying means from a molded plastic material.

A further object of the invention is to provide a molded plastic end cap having a circular bail integrally united thereto by means of a flexible, ribbon-like hinge member, and having a threaded metallic shell projecting therefrom for securing the molded end cap to a correspondingly threaded flashlight casing.

These and other objects of the invention, which will become apparent from a consideration of the following detailed description of the invention, are accomplished by fabricating an end cap from a moldable plastic characterized by its rigidity in thick sections and its flexibility in thin sections. Such an end cap may be made to have a relatively thick section, so as to possess a considerable rigidity. The carrying means may comprise a thin, ribbon-like, flexible hinge member having at an end thereof a circular bail. The hinge member is preferably united with the end cap in such a way as to enhance its structural strength and to avoid points of weakness.

In molding the end cap, it is desirable to provide a flat end panel having resilient projections extending therefrom between which the bail may be releasably secured. Similarly, on the interior surface of the end panel, there may be provided two considerably larger projecting prongs between which a spare bulb for the flashlight may be detachably secured. Additional objects, advantages, and features of the invention reside in the construction, arrangement, and combination of parts which will be more readily apparent from the following description of the accompanying drawings, wherein:

Fig. 1 is a sectional view of a flashlight casing including the end cap and the carrying means according to the present invention;

Fig. 2 is a perspective view of the end cap and carrying means or bail showing the bail in its closed position;

Fig. 3 is a perspective view of the end cap showing the bail in its open position;

Fig. 4 is a top plan view of the end cap, showing the bail in an extended position;

Fig. 5 is a top plan view of the end cap showing the bail in closed position;

Fig. 6 is a plan view of the interior of the end cap;

Fig. 7 is a section taken on line 7—7 on Fig. 5;

Fig. 8 is a sectional view taken on line 8—8 of Fig. 5;

Fig. 9 is an enlarged fragmentary view taken from Fig. 8, showing the bail secured between projecting prongs on the end panel;

Fig. 10 is an enlarged fragmentary sectional view of the end cap, taken from Fig. 7.

Referring more particularly to the drawings, Fig. 1 is a sectional view of a flashlight casing 1 manufactured from a synthetic plastic molding powder. Disposed within the flashlight casing are the conventional dry cells 2, a conventional switching mechanism 3, and a conventional lens structure 4. The largest portion of the flashlight casing is a molded plastic tubular member 5, to which a front cap 6 and an end cap 7 are secured. A metallic threaded member 8 is molded into the rear end of the tubular member 5, and provides securing means whereby the end cap may be detachably secured to the tubular member.

The end cap 7 comprises a rigid body of molded plastic having inset therein a threaded metallic shell 9 an extension of which engages a correspondingly threaded metallic liner 8 in the tubular member 5 and thereby secures the end cap 7 to said tubular member. Although the exact configuration of the end cap may be varied somewhat to harmonize with the design of the entire flashlight casing, in the preferred embodiment of the invention, the end cap preferably comprises a cylindrical portion 11 which terminates in a shoulder 12. Extending rearwardly from the shoulder 12 is a truncated conical section which terminates at a flat end panel 14.

A ribbon-like hinge member 15 extends tangentially from the cylindrical body portion 11 rearwardly of the flashlight in a direction which is parallel to the axis of the cylindrical body portion. The hinge member 15 terminates in an integral union with a bail or hanger ring 16, which may be of fairly substantial cross section and possessed of considerable strength. In the closed position illustrated in Figure 2, the bail 76 may be removably secured in place between extensions 17 of the truncated conical section 13 and resilient projecting prongs 18 extending above the surface of the end panel 14.

Referring specifically to Figures 2 and 3, with the exception of the inset metallic threaded shell 9, each structural part of the end cap which has just been referred to is made by a single molding step, and each of the structural parts are integrally united in a monolithic structure. Although the ribbon-like hinge member 15 is relatively thin and flexible, it nevertheless possesses a considerable strength and is more than sufficient to support the weight of the entire flashlight, both in a stationary position and in motion, with all of the consequent abuse which would necessarily accrue from all types of use.

A further desirable structural feature may be incorporated in the end cap if desired. Frequently, it is quite useful to have a spare bulb stored within a flashlight casing. This may be accomplished by molding, within the end cap, on the inner surface of the end panel 14, a pair of projecting prongs 19 of sufficient resilience so that the metallic base 20 of a bulb may be grasped therebetween, preferably within a slight recess 21 (Fig. 8). The projecting prongs 19 may extend through an aperture 22 in the inset metallic shell 9 or may be soldered or riveted to the base of said shell.

Though a plurality of means may be employed for retaining the bail 16 in a closed position on the end cap, in a preferred embodiment of the invention, the end panel 14 is provided with arcuate extensions 17 of the truncated conical section 13. The bail 16 is desirably of such a size that it will fit snugly within the two arcuate extensions 17. In order to retain the bail 16 in closed position, there are also provided a pair of projecting prongs 18 having smaller outwardly directed retaining ridges 23 at the upper extremities thereof. Each retaining ridge 23 is preferably of such a size that a slight pressure is needed to position the bail 16 between the projecting prong 18 and the extension 17 on the truncated conical section, as illustrated in Fig. 9. The normal resilience of the projecting prongs 18 allows the repeated insertion and withdrawal of the bail 16 from open to closed position. The arcuate extensions 17 of the truncated conical section are desirably of just sufficient arcuate length so that an open area 24 remains between the opposed extensions 17 for the unimpeded insertion of the hinge 15 when the bail is in its closed position. A corresponding, oppositely disposed open area 25 allows the bail to be grasped and removed from its closed position.

The metallic shell 9 is preferably inserted in the end cap while the plastic is still warm and flexible from the molding operation. While the plastic is in this condition, the metallic shell can slip past the raised annular ring in the end cap, which snaps into place in the corresponding indentation 27 in the metallic shell, securing the shell in position. The projecting prongs 19, which protrude through the aperture 22 in the shell, prevent rotary movement of the shell relative to the end cap. Where the projecting prongs 19 are made of metal and are soldered or otherwise joined directly to the metallic shell, some other means should be provided to prevent rotary relative movement between the metallic shell and the end cap.

There has thus been provided a novel, simple and extremely useful type of end cap molded as a unitary mass from a plastic material. The preferred molding material is a polyamide (nylon) molding powder characterized by its rigidity in thick sections, flexibility in thin sections, and high tensile strength. Other desirable properties of molded articles from polyamide (nylon) molding powder are high impact strength, tensile strength, flexure, inertness to grease, oil, alcohol and other industrial chemicals, and ability to withstand low temperatures without becoming brittle. While a polyamide molding powder (nylon) is the preferred type of plastic moldable material, since it possesses all of these desirable characteristics, many other plastic and synthetic plastic materials may be employed as well. For example, natural rubber may be employed for the end cap construction where careful control is maintained over hardness and plasticity. Synthetic rubbers may also be employed. It is also possible to employ different plastic materials for the bail and hinge, where the different plastics are compatible. Thus, the bail may be a translucent polyacrylate resin, such as "Lucite," while the hinge may be a polyamide (nylon) molding, the bail and hinge being integrally fused together during the molding process.

Other modifications in structure and arrangement, and other substitutions of materials within the scope of the invention, will be obvious to those skilled in the art.

I claim:

1. In a tubular flashlight comprising a casing including a chamber for one or more batteries, a reflector and bulb mounted in one end of said chamber, a removable end cap closing the opposite end of said chamber from said reflector and bulb, a switch mounted on said casing and metallic conductive elements within said chamber to provide a major part of the electrical circuit controlled by said switch, the improvement in which the end cap comprises a substantially cup-shaped member defined by an end wall and a cylindrical side wall; an annular carrying bail, a ribbon-like flexible strip secured at one end to the outside surface of said cylindrical side wall of said cup-shaped member and at its other end to said annular carrying bail, means on the outside of said end wall for holding said carrying bail against said end wall when said bail is not in use; the substantially cup-shaped member, the flexible strip and the annular carrying bail all being integrally molded of a plastic, whereby said connecting strip is distortable to permit said bail to be rotated and moved in a wide range of directions with respect to said cup-shaped member.

2. A tubular flashlight as described in claim 1 wherein the outside of said end wall of said end cap has a central, substantially circular recess having a flat floor substantially surrounded by curving walls, and wherein the means for holding said carrying bail comprises a pair of resilient prongs projecting upward from said floor spaced in from said curving walls and approximately diametrically opposed with respect to said end wall, each of said prongs having a retaining ridge adjacent the distal end thereof, said ridges being directed outwardly with respect to the center of the recess, whereby said annular carrying bail, when not in use, may be snapped over said ridges on said prongs and seated on the floor of said recess and be held in such position by the compressive engagement of said prongs and the curving walls of said recess acting on two areas of said annular carrying bail.

References Cited in the file of this patent

UNITED STATES PATENTS

| 1,591,980 | Jones | July 13, 1926 |
| 1,984,401 | Desimone | Dec. 18, 1934 |
| 2,298,042 | Desimone | Oct. 6, 1942 |
| 2,299,035 | Rothenberg et al. | Oct. 13, 1942 |
| 2,355,247 | Slocum | Aug. 8, 1944 |
| 2,727,547 | Moon | Dec. 20, 1955 |

FOREIGN PATENTS

| 854,607 | France | Jan. 24, 1940 |
| 819,208 | Germany | Aug. 17, 1953 |